United States Patent Office 2,718,527
Patented Sept. 20, 1955

2,718,527

PROCESS FOR THE PREPARATION OF DICHLORACETAMIDO PROPANES

Basil Jason Heywood, Romford, England, assignor, by mesne assignments, to Parke, Davis & Company, Detroit, Mich., a corporation of Michigan No Drawing. Application May 14, 1951
Serial No. 226,290

Claims priority, application Great Britain May 19, 1950

7 Claims. (Cl. 260—562)

This present invention relates to the preparation of dichloracetamides and is particularly concerned with the preparation of N-dichloracetyl derivatives of the general formula:

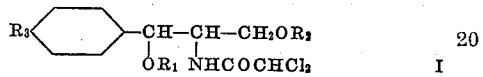

in which:

$R_1$ and $R_2$ are the same or are different, each representing a hydrogen atom or a lower alkyl or aralkyl group or together constituting a divalent atom or group of atoms joining the two oxygen atoms such as —CO—, or —CHR_4— where $R_4$ represents a hydrogen atom or a lower alkyl, cycloalkyl, aryl or aralkyl group and $R_3$ represents a hydrogen atom or a nitro group. In a preferred form of this invention, $R_1$ and $R_2$ each represent a hydrogen atom.

Various processes have heretofore been employed for the preparation of certain of these compounds; thus, for example, the acid chloride, anhydride, or esters of dichloracetic acid are known to react with the appropriate amines to give compounds of type I in which $R_1$ and $R_2$ represent hydrogen atoms.

It is the object of the present invention to provide improved syntheses of the aforesaid compounds which offer commercial advantage over those hitherto employed.

In accordance with this invention, the N-dichloracetyl derivatives of type I are prepared by reacting the corresponding amines of the type:

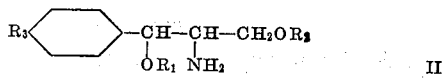

with chloral cyanhydrin, or precursor therefor, in the presence of an acid-binding agent. If desired, the chloral cyanhydrin may first be treated with an acid-binding agent and the reaction product so-obtained used as the dichloracetylating agent.

In accordance with a feature of this invention, an especially convenient precursor for chloral cyanhydrin consists of chloral, or chloral hydrate, in the presence of an alkali metal cyanide catalyst, the catalyst being preferably employed in quantity less than one molecular equivalent of the reacting amine.

In carrying the present invention into effect, the acid-binding agent used may be an inorganic or a tertiary organic base or an excess of the reacting amine or, when such is to be present in the reaction mixture as catalyst, an excess of alkali metal cyanide catalyst. The preferred acid-binding agents are strong tertiary organic bases such as triethylamine when chloral cyanhydrin is employed directly as the dichloracetylating agent, whereas when chloral or chloral hydrate is used inorganic bases such as precipitated calcium carbonate, magnesium oxide and sodium carbonate have been found to be most advantageous.

The reaction medium may be aqueous or non-aqueous and, of organic solvents, both dioxan and pyridine have been found to be very suitable, the preferred reaction medium when chloral or chloral hydrate is employed being water and, when chloral cyanhydrin is employed, dioxan.

When chloral cyanhydrin is employed as such, the reaction is preferably effected at a temperature of 0–25° C. while, when chloral or chloral hydrate is employed in the presence of cyanide catalyst, it is preferred to increase the reaction temperature to 60–100° C.

In addition to the high degree of purity and the excellent yields in which the products are obtained, a further advantage of the process of the present invention is that, using chloral cyanhydrin direct, the reaction proceeds at normal temperatures thus enabling simpler procedures to be used than those of the methods previously employed.

The products of this invention can be regarded as comprising the compounds of type III and those of type IV

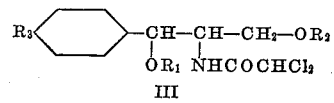

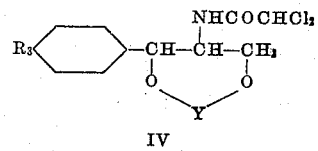

in which $R_1$ and $R_2$ are separate radicals hereinbefore defined (preferably hydrogen atoms) and Y represents the case where $R_1$ and $R_2$ in general formula I together constitute a divalent atom or group. These compounds, like the amines from which they are prepared, each contain two asymmetric carbon atoms and can exist in structural as well as optical isomeric forms. The term "structural" refers to the spatial relationship of the polar groups respectively attached to the two asymmetric carbon atoms. In conformity with the nomenclature adopted by M. C. Rebstock, H. M. Crooks, J. Controulis and Q. R. Bartz, L. H. Long and H. D. Troutman in the Journal of the American Chemical Society 1949, volume 71, pages 2458 to 2473, the diastereoisomeric forms are designated "erythro" and "threo" respectively.

Both the erythro and the threo forms can exist as racemates of optically active isomers whence it follows that each compound can exist in six different forms and, accordingly, a given structural formula of the conventional type as used herein, represents any of the forms, the racemates of the erythro and threo series and four individual isomers, D-erythro, L-erythro, D-threo and L-threo or a mixture of two or more of these forms unless otherwise stated.

An especially important feature of the present invention consists in the production of DL- and L- erythro compounds of type III employing the corresponding amines of type II, which compounds of type III are valuable intermediates for the production of the therapeutically active D-threo 2-dichloracetamido-1-p-nitrophenyl-propane 1:3-diol, commonly known as chloramphenicol and the DL-mixture containing the same. The compounds of type IV may be converted into those of type III by hydrolysis.

The present invention is illustrated by the following examples.

*Example I*

To a stirred and refluxing mixture of DL-erythro 5-amino-4-phenyl-2-methyl-1:3-dioxan (19.5 g.) precipitated calcium carbonate (12.0 g.) sodium cyanide (0.95 g.) and water (45 cc.), a solution of chloral hydrate (25.4 g.) in water (10 cc.) was added cautiously over ten minutes. The reaction mixture was stirred and refluxed for ten minutes further and then allowed to cool. Sufficient hydrochloric acid was added to the stirred reaction mixture to render it acid to Congo red. The DL-erythro 5-dichloracetamido-4-phenyl-2-methyl-1:3-dioxan (25.5 g.) 85% of theory was filtered off and dried at 100° C. The amide may be crystallised from methanol when it separates in colourless crystals M. P. 220–222° C.

*Example II*

To a stirred mixture at 95° C. of DL-erythro 5-amino-4-phenyl-2-methyl-1:3-dioxan (3.94 g.), dioxan (5 cc.), water (5 cc.), sodium cyanide (0.2 g.) and sodium acetate crystals (4.5 g.) was added a solution of chloral hydrate (4.67 g.) in water (2 cc.) over 30 seconds. The emulsion was stirred at 95–100° C. for 10 minutes and then seeded with crystals of the desired product, when the mass crystallised. The mixture was cooled to 15° C., made acid to Congo red and the reaction product isolated. The product, DL-erythro 5-dichloracetamido-4-phenyl-2-methyl-1:3-dioxan, melted at 216–217° C. One crystallisation of this product from methanol gave a pure product, melting at 224° C.

*Example III*

In places of 19.5 g. of DL-erythro 5-amino-4-phenyl-2-methyl-1:3-dioxan used in Example I, 21.2 g. of DL-threo 2-amino-1-p-nitrophenylpropane 1:3-diol were employed. The dichloracetyl derivative, DL-threo 2-dichloracetamide-1-p-nitrophenylpropane 1:3-diol was filtered off as in Example I and a further quantity obtained by extraction of the aqueous filtrate with ethyl acetate and evaporation of the extract. The total yield was 28.1 g. which is 87% of theory. Crystallisation from a mixture of ethyl acetate and petroleum ether gave an almost colourless product melting at 150° C.

*Example IV*

A mixture of DL-erythro 2-amino-1-p-nitrophenylpropane 1:3-diol (0.53 g.), magnesium oxide (0.125 g.), sodium cyanide (0.05 g.) and water (2.5 cc.) was stirred and heated to the boiling point. A solution of chloral hydrate (0.582 g.) in water (1 cc.) was added over ½ minute and the reaction was allowed to stir and reflux for 10 minutes. The cooled reaction mixture was made acid to Congo red by the addition of hydrochloric acid and the crystalline product filtered off, washed with a little water and dried. The yield of DL-erythro 2-dichloracetamido-1-p-nitrophenylpropane 1:3-diol obtained was 65% theory.

*Example V*

To a mechanically stirred solution at 40° C. of DL-erythro 2-amino-1-p-nitrophenylpropane 1:3-diol (0.53 g.), sodium carbonate (anhydrous 0.325 g.), sodium cyanide (0.05 g.) and water (2.5 cc.) was added over ½ minute a solution of chloral hydrate (0.625 g.) in water (1 cc.). The product, DL-erythro 2-dichloracetamido-1-p-nitrophenylpropane 1:3-diol, was isolated in the same way as described in Example IV.

*Example VI*

The sodium cyanide (0.05 g.) employed in Example V, was replaced by potassium cyanide (0.066 g.), and gave the same reaction product.

*Example VII*

Proceeding as in Example V but replacing the DL-erythro 2-amino-1-p-nitrophenylpropane 1:3-diol by the optically active dextro rotatory L isomer hydrochloride $[(\alpha)_D = +15.8°$ $(c=6\%$ in water$)]$, there was obtained L-erythro 2-dichloracetamido-1-p-nitrophenylpropane 1:3-diol, M. P. 173–5° C.

*Example VIII*

To a stirred solution of DL-erythro 2-amino-1-p-nitrophenylpropane 1:3-diol (0.53 g.) and potassium cyanide (0.216 g.) in water (2.5 cc.) at 40° C. was added to a solution of chloral hydrate (0.496 g.) in water (2.5 cc.). The reaction mixture was stirred for 10 minutes and then the product isolated as decribed in Example IV. The yield obtained of DL-erythro 2-dichloracetamido-1-p-nitro-phenylpropane 1:3-diol was 72% of theory.

*Example IX*

To a stirred suspension of DL-erythro 2-amino-1-p-nitrophenylpropane 1:3-diol (0.53 g.), magnesium oxide (0.756 g.), sodium cyanide (0.061 g.) and water at 40° C. was added over 10 minutes a solution of chloral hydrate (0.62 g.) in water (1 cc.). The DL-erythro 2 - dichloracetamido-1-p-nitrophenylpropane 1:3-diol obtained was isolated as described in Example IV. The yield was 60% of theory.

The reaction can be carried out at 100° C. with a slightly improved yield.

*Example X*

A mixture of DL-threo 2-amino-1-p-nitrophenylpropane 1:3-diol (2.12 g.) chloral hydrate (2.20 g.) dry pyridine (5 cc.) and sodium cyanide (0.7 g.) was heated on the steam bath for some hours. The solution was poured onto water and the precipitated solid filtered off and dried at 100° C. After crystallisation from ethyl acetate-petroleum ether mixture, the DL-threo 2-dichloracetamido-1-p-nitrophenylpropane 1:3-diol so obtained melts at 150–151° C.

The reaction medium, pyridine, used in this example can be replaced by dioxan with a similar result.

*Example XI*

2.5 g. of DL-erythro 2-amino-1-p-nitrophenylpropane 1:3-diol hydrochloride of M. P. (cap.) 208–211° C. were suspended in anhydrous dioxan (12 cc.) with anhydrous pyridine (1.9 cc.). After cooling to +10° C., chloral hydrate (2.56 g.) was added. The temperature rose to +15° C., and after recooling to +8° C., 0.87 g. of sodium cyanide (95% purity) was added; the temperature rose to 30° C. The milky solution obtained was agitated for two hours at ordinary temperature, then diluted with distilled water (40 cc.) and left to stand for one hour in an ice-bath. The product which crystallised was separated off, washed with water and dried in vacuo. A crude product (2.4 g.) of M. P. (cap.) 150–160° C. was obtained which on recrystallisation and decolourisation with charcoal in boiling water (50 cc.) gave DL-erythro 2-dichloracetamido-1-p-nitrophenylpropane 1:3-diol, M. P. (cap.) 169.5–170.5° C.

*Example XII*

Chloral cyanhydrin (10.9 g.) was dissolved in dioxan (20 cc.) and cooled in an ice-water bath while DL-erythro 5-amino-4-phenyl-2-methyl-1:3-dioxan (9.65 g.) (M. P. 73–75° C.) was added over five minutes. To the cooled solution was added slowly triethylamine (10 g.). The almost solid suspension was allowed to stand at normal temperature for 14 hours and then poured onto ice and water. After standing for some time, the suspension was made acid to Congo red by the addition of concentrated hydrochloric acid and the solid was filtered off. The yield of DL-erythro 5-dichloracetamido-4-phenyl-2-methyl-1:3-dioxan was 90% of theory. After purification the melting point was 220–224° C. The product is believed to have the formula:

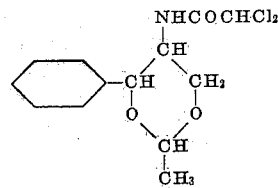

*Example XIII*

Chloral cyanhydrin (10.9 g.) was dissolved in dioxan (20 cc.) and cooled in an ice-water bath while DL-threo 5-amino-4-phenyl-2-methyl-1:3-dioxan (9.65 g.) (B. P. 85–87° C./0.04 mm. picrate, M. P. 223° C.) was added over five minutes. To the cooled solution was added slowly triethylamine (10 g.) and the suspension was then allowed to stand at normal temperature for ten hours. The suspension was poured onto ice and water and, after allowing to stand for a few hours, the suspension was made acid to Congo red by the addition of concentrated hydrochloric acid. The dichloracetyl derivative was filtered off and washed with water. The yield (15.18 g.) of DL-threo 5-dichloracetamido-4-phenyl-2-methyl-1:3-dioxan was 100%. The purified product melted at 131–131.5° C. This product is also represented by the same structural formula as shown in Example XII, although of course, they are different chemical compounds.

Example XIV

DL-erythro 5 - amino - 4 - phenyl - 2 - methyl - 1:3-dioxan (1.93 g.) (M. P. 73–75° C.) was dissolved in 2 N hydrochloric acid (5 cc.) and water (10 cc.). The solution was cooled to 0° C. and chloral cyanhydrin (2.25 g.) added. To this stirred and cooled solution was added 2 N sodium hydroxide over half an hour. The suspension was allowed to stand overnight when the crystalline solid was filtered off, washed with water and dried. The yield (2.0 g.) of DL-erythro 5-dichloracetamido-4-phenyl-2-methyl-1:3-dioxan was 66% of theory.

Example XV

DL-threo 2-amino-1-p-nitrophenylpropane 1:3-diol (4.24 g.) was dissolved in pure hot dioxan (25 cc.) and the solution allowed to crystallise in an ice-water bath. When the temperature had reached 10° C. solid chloral cyanhydrin (4.5 g.) was added, followed, after standing for five minutes, by the addition over a period of about 5 minutes of a solution of triethylamine (5.5 cc.) in dioxan (12 cc.). The last addition caused an exothermic reaction to take place and the temperature was maintained below 30° C. by cooling in an ice-water bath. The pale brown suspension was allowed to stand overnight at normal temperature and then poured onto ice (100 g.) and water (200 g.). After standing for four hours, the suspension was made acid to Congo red by the addition of concentrated hydrochloric acid. The dichloracetyl derivative was filtered off and washed with water. The aqueous filtrate was extracted with ethyl acetate and, after concentration to small volume, a little petroleum ether added which caused a further quantity of the dichloracetyl derivative to separate. The yield (6.40 g.) of DL-threo 2-dichloracetamido-1-p-nitrophenylpropane 1:3-diol (commonly known as racemic Chloramphenicol) was 99% of theory and it melted at 149–151° C. It was obtained as an almost colourless crystalline solid.

Example XVI

The triethylamine (5.5 cc.) in dioxan (12 cc.) used in Example XV was replaced by anhydrous sodium carbonate (2.6 g.). The yield of DL-threo 2-dichloracetamido-1-p-nitrophenylpropane 1:3-diol was not, however, as great as that obtained in Example XV.

Example XVII

Chloral cyanhydrin (4.3 g.) was added to dry pyridine (15 cc.) and immediately afterwards DL-threo 2-amino-1-p-nitrophenylpropane 1:3-diol (4.2 g.) was added to the cooled solution. The internal temperature rose to 40° C. and the mixture was heated on a steam bath for 15 minutes. The light brown solution was poured onto water and ice and, after standing for one hour, acidified with concentrated hydrochloric acid. The DL-threo 2-dichloracetamido-1-p-nitrophenylpropane 1:3-diol was filtered off and crystallised from a mixture of ethyl acetate and petroleum ether. The product was identical with that of Example XV.

Example XVIII

DL-threo 2-amino-1-p-nitrophenylpropane 1:3-diol hydrochloride (2.49 g.) was dissolved in water (15 cc.). Chloral cyanhydrin (2.5 g.) was dissolved in this solution and, after cooling to 0° C., triethylamine (3.0 g.) was added drop by drop over five minutes with shaking between each addition. An oil was deposited which solidified after shaking for half an hour. The suspension was allowed to stand for four hours and then made acid to Congo red by the addition of concentrated hydrochloric acid. The DL-threo 2-dichloracetamido-1-p-nitrophenylpropane 1:3-diol was filtered off, washed with water and dried. The yield (3.15 g.) was 97% of theory. The product is the same as that of Example XV.

Example XIX

A mixture of L-erythro 2-amino-1-p-nitrophenylpropane 1:3-diol hydrochloride (12.6 g.) (M. P. 194–8° C. $(\alpha)_D = +15.8°$ ($c=6\%$ in water)), dry dioxan (65 cc.) and dry triethylamine (6.2 cc.) was allowed to stand at laboratory temperature for one hour. Chloral cyanhydrin (11.8 g.) was added over five minutes and the mixture cooled in an ice bath. Three amounts of triethylamine (5 cc., 5 cc., and 2.5 cc.) were added with good stirring at intervals of five minutes. The slightly brown crystalline magma was allowed to stand at laboratory temperature overnight. The triethylamine hydrochloride was filtered off and washed with dioxan. The combined filtrates were evaporated to about 50 cc. under reduced pressure and, after cooling, the solid collected and washed three times with water. The dioxan filtrate and the aqueous washings were combined and extracted with ethyl acetate to yield, on concentration, a second yield of product. The total yield obtained of L-erythro 2-dichloracetamido-1-p-nitrophenylpropane 1:3-diol, M. P. 178° C. $(\alpha)_D = -25.8°$ ($c=4\%$ in acetone), was 12.8 g. or 78% of theory.

Example XX 4.24 g. of DL-erythro 2-amino-1-p-nitrophenylpropane 1:3-diol of M. P. 108–109° C. were dissolved in anhydrous dioxan (25 cc.) by heating to 70° C. The solution was cooled to $+10°$ C. and at this temperature chloral cyanhydrin (4.5 g.) was added. After 5 minutes a solution of anhydrous triethylamine (4.0 g.) in dioxan (12 cc.) was run in, keeping the temperature at about 30° C. The mixture was stirred for 2 hours at ordinary temperature then left to stand overnight. The product which crystallised was filtered off and the filtrate evaporated under reduced pressure. The residue of the filtration and the residue of the evaporation were taken up in water (35 cc.), and after acidifying with sulphuric acid and filtering the crude product obtained (6.64 g.) was recrystallised in water. There were obtained 4.66 g. of DL-erythro 2-dichloracetamido-1-p-nitrophenylpropane 1:3-diol of M. P. 169–171° C. By extraction of the mother liquors a second yield (0.44 g.) was obtained of M. P. 168–170° C.

Example XXI

DL-erythro 2-amino-1-p-nitrophenylpropane 1:3-diol hydrochloride (4.97 g.) were suspended in anhydrous dioxan (25 cc.). Anhydrous triethylamine (2.0 g.) was added and after stirring for 1 hour at about 70° C. the mixture was cooled to $+10°$ C. and treated as in Example II with chloral cyanhydrin (4.5 g.) and anhydrous triethylamine (4.0 g.) in dioxan (12 cc.). A first yield was obtained of 3.84 g. of DL-erythro 2-dichloracetamido-1-p-nitrophenylpropane 1:3-diol, M. P. 167–168° C., and a second yield (0.19 g.) of M. P. 162–166° C.

Example XXII

DL-erythro 2-amino-1-nitrophenylpropane 1:3-diol (5.3 g.) was dissolved in dry pyridine (25 cc.) and the solution then cooled to 0° C. Chloral cyanhydrin (5.5 g.)

was added carefully, keeping the temperature at 0° C. Anhydrous sodium carbonate (3.25 g.) was added, and the reaction mixture allowed to stand at normal temperature overnight. The next day the pyridine suspension was poured into water, made acid to Congo red and the DL-erythro 2-dichloracetamido-1-p-nitrophenylpropane 1:3-diol obtained filtered off, washed with water and dried.

Example XXIII

DL-erythro 2-amino-1-phenylpropane 1:3-diol (0.4 g.: M. P. 103° C.) was dissolved in dry dioxan (8.0 cc.) at 50–60° C. and the solution was then cooled to laboratory temperature. Chloral cyanhydrin (0.6 g.) was added, followed by triethylamine (1.5 cc.). The reaction mixture was cooled during the additions. After standing overnight, the reaction mixture was poured into ice-water (50 g.). At first a solution was obtained but on standing for 5–10 minutes, the product separated in a colourless felt-like mass of crystals. After standing for two hours, the mixture was made acid to Congo red by the addition of concentrated hydrochloric acid. The crystals were filtered off and dried at 100° C. A further amount of product was obtained by extracting the filtrate with chloroform. The total yield obtained of DL-erythro 2-dichloracetamido-1-phenylpropane 1:3-diol (M. P. 156–158° C.) was 0.60 g., or 92% of theory.

Example XXIV

DL-erythro 2-amino-1-phenylpropane 1:3-diol (1.67 g.) was dissolved in pure hot dioxan (32 cc.), and then the solution cooled in an ice-bath. Solid chloral cyanhydrin (2.5 g.) was added, followed, after standing for five minutes, by triethylamine (6.0 cc.) added over five minutes. The colourless suspension so formed, was allowed to stand overnight at normal temperature and then poured onto ice (50 g.) and water (50 cc.). After standing for two hours the suspension was made acid to Congo red by the addition of concentrated hydrochloric acid. The dichloracetyl derivative was filtered off and washed with water. An improved yield was obtained by extracting the aqueous filtrate with ethyl acetate. The total yield (2.56 g.) of DL-erythro 2-dichloracetamido-1-phenylpropane 1:3-diol was 92% of theory. It was obtained as colourless needles.

Example XXV

A solution of chloral cyanhydrin (5.64 g.) dissolved in dry dioxan (25 cc.) at 10° C. was treated slowly with a solution of triethylamine (6.87 g.) dissolved in dry dioxan (30 cc.) at such a rate that the temperature did not rise above 15° C. The precipitated triethylamine hydrochloride was filtered off and washed with dry dioxan. To the filtrate was added a solution of DL-erythro 2-amino-1-p-nitrophenylpropane 1:3-diol (5.3 g.) in dry dioxan (250 cc.), and the reaction allowed to proceed at normal temperatures overnight.

The next day the solution was poured into a large excess of water and the solution made acid to Congo red. The desired product, DL-erythro 2-dichloracetamido-1-p-nitrophenylpropane 1:3-diol was extracted with ethyl acetate (6 extractions). After concentration of the ethyl acetate solution to 40 cc., the crude product crystallised on cooling (7.7 g., 95% of theory). Crystallisation of the crude product from dioxan gave the pure product, M. P. 176° C.

Racemic threo and erythro-5-amino-4-phenyl-2-methyl-1:3-dioxan employed as starting materials in certain of the foregoing examples were prepared as follows: benzaldehyde and 2-nitroethanol were condensed together as described by Controulis, Rebstock and Crooks in the Journal of the American Chemical Society of 1949, volume 71, page 2463, and the sodium salt converted to 2-nitro-1-phenylpropane 1:3-diol by means of acetic acid in the presence of ether. The threo and the erythro isomers of 2-nitro-1-phenylpropane 1:3-diol were separated by crystallisation. Each isomer was converted to the DL-5-nitro-4-phenyl-2-methyl-1:3-dioxan by treatment of the ethereal solution of the diol with acetaldehyde in the presence of an acid catalyst such as p-toluene sulphonic acid. Catalytic reduction of the threo and erythro nitro-dioxans gave the desired amines.

I claim:
1. Process for the production of a compound of formula,

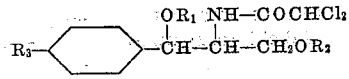

in which $R_1$ and $R_2$ are members of the class consisting of hydrogen atoms and further members wherein $R_1$ and $R_2$ together form a —CH(lower alkyl)-group and $R_3$ is a member of the class consisting of H and $NO_2$, which comprises reacting an amine of formula,

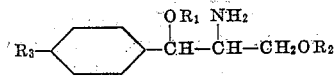

with a dichloracetylating agent of the class consisting of (1) at least one equivalent of chloral cyanhydrin, (2) at least one equivalent of chloral and less than one equivalent of an alkali metal cyanide and (3) at least one equivalent of chloral hydrate and less than one equivalent of an alkali metal cyanide in an alkaline reaction medium at a temperature below about 100° C.

2. Process for the production of a compound of formula,

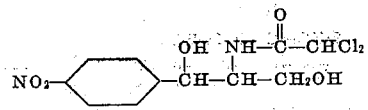

which comprises reacting an amine of formula,

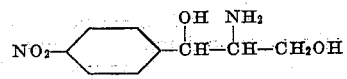

with at least one equivalent of chloral hydrate in the presence of less than one equivalent of an alkali metal cyanide in an alkaline reaction medium at a temperature below about 100° C.

3. Process for the production of a compound of formula,

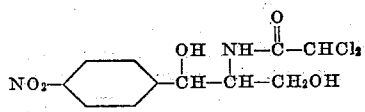

which comprises reacting an amine of formula,

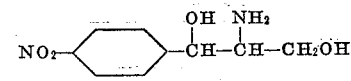

with at least one equivalent of chloral hydrate in the presence of less than one equivalent of an alkali metal cyanide at a temperature between 60 and 100° C. in an aqueous reaction medium containing at least one equivalent of an inorganic base.

4. Process for the production of DL-erythro-2-dichloracetamido-1-p-nitrophenylpropane-1,3-diol which comprises reacting DL-erythro-2-amino-1-p-nitrophenylpropane-1,3-diol with at least one equivalent of chloral hydrate in the presence of less than one equivalent of sodium cyanide at a temperature 100° C. in an aqueous reaction medium containing at least one equivalent of magnesium oxide.

5. Process for the production of a compound of formula,

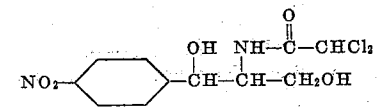

which comprises reacting an amine of formula,

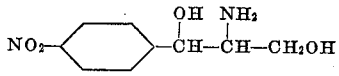

with at least one equivalent of chloral cyanhydrin in an alkaline reaction medium at a temperature between 0 and 25° C.

6. Process for the production of a compound of formula,

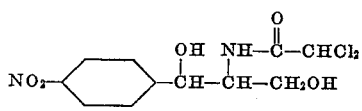

which comprises reacting an amine of formula,

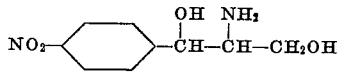

with at least one equivalent of chloral cyanhydrin at a temperature between 0 and 25° C. in an anhydrous organic solvent containing at least one equivalent of a tertiary organic amine.

7. Process for the production of DL-threo-2-dichloracetamido-1-p-nitrophenylpropane-1,3-diol which comprises reacting DL-threo-2-amino-1-p-nitrophenylpropane-1,3-diol with at least one equivalent of chloral cyanhydrin at a temperature between 0 and 25° C. in anhydrous dioxane containing at least one equivalent of triethylamine.

References Cited in the file of this patent

UNITED STATES PATENTS

| | | |
|---|---|---|
| 2,483,884 | Crooks et al. | Oct. 4, 1949 |
| 2,483,885 | Crooks et al. | Oct. 4, 1949 |

FOREIGN PATENTS

| | | |
|---|---|---|
| 503,348 | Belgium | June 15, 1951 |

OTHER REFERENCES

Irving: "J. Chem. Soc." (London) 1936, pp. 797–801.
Beilstein: "Handbuch Organischen Chemie" 4th ed., vol. 3 (1921), p. 288.
Migrdichian: "The Chem. of Org. Cyanogen Compounds" (1947), pp. 187–188.